United States Patent
Polle (10) Patent No.: US 10,565,715 B2
(45) Date of Patent: Feb. 18, 2020

(54) METHOD OF ESTIMATING THE MOTION OF A CARRIER WITH RESPECT TO AN ENVIRONMENT AND CALCULATION DEVICE FOR NAVIGATION SYSTEM

(71) Applicant: AIRBUS DEFENCE AND SPACE SAS, Les Mureaux (FR)

(72) Inventor: Bernard Polle, Saint-Orens (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 91 days.

(21) Appl. No.: 15/532,447

(22) PCT Filed: Dec. 2, 2015

(86) PCT No.: PCT/FR2015/053303
§ 371 (c)(1),
(2) Date: Aug. 13, 2017

(87) PCT Pub. No.: WO2016/087784
PCT Pub. Date: Jun. 9, 2016

(65) Prior Publication Data
US 2017/0345166 A1 Nov. 30, 2017

(30) Foreign Application Priority Data
Dec. 3, 2014 (FR) .................................... 14 61835

(51) Int. Cl.
*G06T 7/277* (2017.01)
*G01C 21/00* (2006.01)

(52) U.S. Cl.
CPC ............ *G06T 7/277* (2017.01); *G01C 21/005* (2013.01); *G06T 2207/30241* (2013.01); *G06T 2207/30244* (2013.01)

(58) Field of Classification Search
CPC .................................................. G01C 21/005
See application file for complete search history.

(56) References Cited

U.S. PATENT DOCUMENTS

| 4,347,511 A | * | 8/1982 | Hofmann | ............. | G01C 21/005 |
| | | | | | 342/64 |
| 8,706,298 B2 | * | 4/2014 | Goulding | ............... | G06N 3/008 |
| | | | | | 700/251 |

(Continued)

FOREIGN PATENT DOCUMENTS

FR 2 964 774 A1 3/2012

OTHER PUBLICATIONS

Neubert et al., "A fast Visual Line Segment Tracker," IEEE Int. Conf. on Emerging Technologies and Factory Automation, Hamburg, Germany, Sep. 15-18, 2008, pp. 353-360.

(Continued)

*Primary Examiner* — Nay A Maung
*Assistant Examiner* — Jose Torres
(74) *Attorney, Agent, or Firm* — Im IP Law; Chai Im; C. Andrew Im (57) ABSTRACT

A method for estimating the motion of a carrier with respect to an environment in relation to which the carrier is moving. The carrier bearing a navigation sensor and a vision sensor producing images of the environment. In the images acquired by the vision sensor, the characteristic elements of the images representing characteristic elements of the environment are identified. At least one condensed measurement is calculated as a function of characteristic elements of at least two images acquired at different instants. The motion of the carrier by a navigation filter is estimated, as a function of navigation measurements carried out and as a function of the condensed measurement. The condensed measurement is calculated as a function furthermore of a priori estimation of the motion, as provided by the navigation filter.

20 Claims, 1 Drawing Sheet

(56) References Cited

U.S. PATENT DOCUMENTS

| | | | | |
|---|---|---|---|---|
| 2007/0288141 | A1* | 12/2007 | Bergen | G01C 21/005 701/38 |
| 2008/0023587 | A1* | 1/2008 | Head | B64G 1/10 244/158.4 |
| 2010/0063730 | A1* | 3/2010 | Case | G01C 21/005 701/414 |
| 2012/0070037 | A1 | 3/2012 | Polle | |
| 2016/0084656 | A1* | 3/2016 | Villien | G01C 21/12 |

OTHER PUBLICATIONS

Seitz et al., "A Comparison and Evaluation of Multi-View Stereo Reconstruction Algorithms," CVPR '06 Proceedings of the 2006 IEEE Computer Society Conference on Computer Vision and Pattern Recognition, Jun. 17-22, 2006, pp. 519-528, vol. 1, IEEE Computer Society, Washington, DC, USA.

EADS Astrium, "Final Report—Navigation for Planetary Approach & Landing," May 1, 2016, pp. 1-133, URL:http://emits.sso.esa.int/emits-doc/ESTEC/A06080-RD5-NPAL_Final_Report.pdf.

Voirin et al., "Challenges of Pinpoint Landing for Planetary Exploration: The Lion Absolute Vision-Based Navigation System Step-Wise Validation Approach," Jun. 1, 2013, pp. 1-14, URL:http://elib.dlr.de/94968/1/8A_9 Voirin Challenges of pin-point landing for planetary landing the LION absolute vision-based navigation approach and experimental results.pdf.

Flandin et al., "Vision Based Navigation for Planetary Exploration," Feb. 4, 2009, pp. 1-20, URL:http://emits.sso.esa.int/emits-doc/ESTEC/A06080-RD6-VisNav-paper.pdf.

Polle et al., Autonomous Vision-Based Navigation Demonstration, 7th International ESA Conference on Guidance, Navigation & Control Systems, Jun. 5, 2008, pp. 1-7, URL:ftp://ftp.elet.polimi.it/users/Marco.Lovera/ESAGNC08/Posters/P08/05_Villien.pdf.

Helmick et al., "Path Following using Visual Odometry for a Mars Rover in High-Slip Environments," Aerospace Conference, 2004, Mar. 6, 2004, pp. 1-17, IEEE, Piscataway, NJ, USA.

Frapard et al., "Navigation for Planetary Approach and Landing," 5th International ESA Conference on Guidance, Navigation & Control Systems, Oct. 22, 2015, pp. 1-10, Frascati, Italy, URL:http://emits.sso.esa.int/emits-doc/5126-RD3-Navigation-planetary-approach-landing.pdf.

Polle et al., "Autonomous Navigation Concepts for Interplanetary Missions," IFAC Automatic Control in Aerospace, Jun. 14-18, 2004, pp. 203-208, Saint Petersburg, Russia.

Bodineau et al., "Vision Navigation for European Landers and the NPAL Project," 17th IFAC Symposium on Automatic Control in Aerospace, Jun. 25-29, 2007, vol. 40, issue 7, pp. 395-400, Toulouse, France.

\* cited by examiner

METHOD OF ESTIMATING THE MOTION OF A CARRIER WITH RESPECT TO AN ENVIRONMENT AND CALCULATION DEVICE FOR NAVIGATION SYSTEM

RELATED APPLICATIONS

This application is a § 371 application from PCT/FR2015/053303 filed Dec. 2, 2015, which claims priority from French Patent Application No. 14 61835 filed Dec. 3, 2014, each of which is herein incorporated by reference in its entirety.

TECHNICAL FIELD

The present invention pertains to the field of navigation of carriers such as vehicles, robots, etc. More particularly, the present invention concerns the estimating of the motion of a carrier with respect to an environment in relation to which this carrier is moving.

The environment is for example the surface of a celestial body, another vehicle, a structured relief (town, building), etc.

The carrier must be able to move autonomously in relation to this environment, without a priori knowledge of it, or with a reduced a priori knowledge. For this, it needs to determine its motion with respect to this environment.

BACKGROUND OF THE INVENTION

The motion of the carrier is determined by means of a navigation system comprising one or more navigation sensors carried aboard said carrier. The navigation system determines the motion by an adapted processing of the measurements provided by the navigation sensors. The navigation sensors may be of different types, such as a GPS receiver, accelerometer, odometer, gyroscope, Doppler radar, etc.

The estimating of the motion of the carrier with respect to the environment is done by implementing a navigation filter combining a model of displacement (for example, the kinematic equations of the carrier) with the navigation measurements provided by the navigation sensors.

However, there are many scenarios in which the navigation system alone is not able to correctly estimate the motion of the carrier with respect to the environment.

This is the case, for example, with a wheeled carrier moving on the surface of a ground and provided with an odometer measuring the rotation of the wheels. The odometer measurements are not enough to reconstitute the motion of the carrier when it is slipping or sliding on the ground.

This is also the case with a carrier moving in relation to a celestial body and having an inertial navigation unit providing measurements of angular velocities and linear accelerations along at least three independent axes. A navigation filter processes these measurements at a high rate (typically 150 Hertz) by using a local model of the gravitational field, for example through an extended Kalman filter, in order to return the position and velocity of the carrier with respect to the celestial body. The inevitable deviations of the inertial navigation sensors and the initial lack of knowledge of the position of the carrier with respect to the environment are so many sources of error in the estimation of the motion of said carrier, especially the estimation of its position with respect to the environment. These errors build up and propagate over time in the following estimations.

This is also the case with a carrier having a GPS receiver. Even though such a GPS receiver is generally adapted to provide a precise estimation of the position of the carrier (typically within a meter in certain cases), this precision is degraded in the event of loss or corruption of the GPS measurements. Such a loss or corruption of the GPS measurements may occur in particular due to obstacles in a radio channel between the carrier and the GPS transmitter and/or due to multipath phenomena for said radio channel.

In order to remedy these limitations, it is known to implement a vision system and provide the carrier with one or more vision sensors, which perform the acquisition of two-dimensional images (2D images) of the environment.

The information coming from the vision system is processed by the navigation system. For this, the navigation filter is augmented to take into account the measurements provided by the vision system.

Numerous digital implementations of the augmented navigation filter may be produced, for example, a Kalman filter, an extended Kalman filter, an information filter, a particle filter, a Bayesian filter, etc.

Examples of such augmented navigation systems are described, for example, in the context of spacecraft-type carriers, in the following scientific publications:

"Navigation for Planetary Approach and Landing", B. Frapard et al., 5th International ESA Conference on Guidance Navigation and Control Systems, 22-25 Oct. 2002, Frascati, Italy;

"Autonomous Navigation Concepts for Interplanetary Missions", B. Polle et al., IFAC Symposium on Automatic Control in Aerospace 14-18 Jun. 2004, Saint Petersburg, Russia;

"Mars Sample Return: Optimising the Descent and Soft Landing for an Autonomous Martian Lander", X. Sembély et al., Symposium on Atmospheric Reentry Vehicles and Systems, 23 Mar. 2005, Arcachon, France;

"Vision Navigation for European Landers and the NPAL Project", G. Bodineau et al., IFAC Symposium on Automatic Control in Aerospace, 25-29 Jun. 2007, Toulouse, France.

In these scientific publications, an inertial navigation system is considered which is based on navigation measurements among which measurements of linear accelerations of the vehicle along the three axes of a reference frame tied to the vehicle, and measurements of angular velocities of the vehicle along these three axes. The vector of states of the inertial navigation filter comprises states related to the motion such as the position, velocity, and angles of attitude of the vehicle in a reference frame tied to the environment. The navigation filter propagates (prediction step) an estimation of the vector of states taking into account a local model of the gravitational field, as well as the covariance of the errors in the estimation of these states. The navigation filter readjusts (updating step) the estimation of the vector of states, and consequently that of the motion of the vehicle, based on the navigation measurements.

In these scientific publications, the inertial navigation system is combined with a vision system consisting in a camera carried aboard the vehicle and providing 2D images of the environment at a typical frequency on the order of 10 to 100 Hertz.

In an image, characteristic zones of the environment are identified. A characteristic zone of the environment is a zone whose representation in the image, as an assemblage of pixels, has the property of being able to be found from one image to another, for example, by image correlation or by shape recognition. A characteristic zone of the image may be, for example, a patch of several pixels to several tens of pixels in which there exist variations of luminance or texture or contrast in at least two directions.

One tracks the characteristic zones of the environment from one image to another by image correlation. Each characteristic zone is associated with one point in the image, known as a "characteristic point of the image" $M_i$. The characteristic point $M_i$ is, for example, the radiometric or geometric center of gravity of the patch of pixels representing this characteristic zone, or a particular point of this characteristic zone. The displacement of the characteristic points $M_i$ from one image to another is representative of the motion in translation and rotation of the vehicle with respect to the environment.

The motion of the vehicle in position and attitude is estimated by augmenting the vector of states of the inertial navigation filter with the coordinates, in a reference frame, of characteristic points $M'_i$ of the environment represented by the characteristic points $M_i$ of the image. A reference frame tied to the carrier is denoted by (O, X, Y, Z), and is defined for example by taking O as the center of the focal plane of the camera, Z as the optical axis of the camera, and (X, Y) as the focal plane of the camera.

To estimate the vector of states of the navigation filter, besides the measurements of the inertial navigation system, one uses 2M measurements corresponding to the directions of the vectors $OM'_i$ in the reference frame.

The navigation filter being so augmented both in regard to the states and in regard to the measurements, one estimates the vector of states of the navigation filter as a function of a model of the variation over time of the states of the system and a model of the different measurements.

However, the principal drawback of the navigation systems also utilizing measurements obtained from images lies in the fact that the estimation of the state of the carrier, by means of a navigation filter so augmented with states and measurements associated with the characteristic points $M'_i$, requires major computing power.

It is known from patent FR 2964774 B1 to calculate, from the coordinates of the characteristic points identified in a triplet of images, at least one condensed measurement representative of the motion of the carrier during the acquisition of said triplet of images. The navigation filter then performs a merging of the navigation measurements and the at least one condensed measurement, instead of a merging of the navigation measurements and the coordinates of all the characteristic points. The number of necessary calculations is thus greatly reduced, while improving the performance of the estimation of the motion of the carrier, which likewise benefits from information derivable from images acquired by the vision sensor.

However, the solution described in patent FR 2964774 B1 encounters a problem of ambiguity which is inherent to 2D vision. In fact, when the scene observed is substantially planar, there exist several possible interpretations of the motion leading to the same observation for certain trajectories of the carrier, especially substantially orthogonal to said planar scene, and even a degeneration of the solution not allowing a calculation of a condensed measurement. This problem of ambiguity occurs most particularly in the case of a scenario of landing of the carrier on a celestial body.

SUMMARY OF THE INVENTION

The objective of the present invention is to propose a method for estimating the motion of a carrier which is able to utilize measurements obtained from images of the environment, while limiting the impact from a standpoint of processing complexity and improving the robustness of the estimation as compared to the known solutions of the prior art.

According to a first aspect, the present invention concerns a method for estimating the motion of a carrier with respect to an environment in relation to which said carrier is moving, the carrier bearing on board at least one navigation sensor and at least one vision sensor producing images of the environment, said method comprising the steps of:
identification, in images acquired by the vision sensor, of characteristic elements of the images representing characteristic elements of the environment,
calculation of at least one condensed measurement as a function of characteristic elements of at least two images acquired at different times, the at least one condensed measurement being representative of characteristics of the motion of the carrier during the acquisition of said at least two images,
estimation of the motion of the carrier by an estimation filter, called "navigation filter", as a function of navigation measurements performed by the navigation sensor and as a function of the at least one condensed measurement, in which the at least one condensed measurement is calculated as a function furthermore of an a priori estimation of the motion provided by the navigation filter.

Thus, the method of estimation is based on the calculation of at least one condensed measurement, representative of the motion of the carrier, based on characteristic elements identified in the images, such that the quantity of information resulting from images, processed by the navigation filter, is greatly reduced as compared to the assemblage of the characteristic elements. To improve the robustness of the estimation, and in particular remove the ambiguities inherent to 2D vision, the calculation of the at least one condensed measurement furthermore takes into account an a priori estimation of the motion, which is advantageously estimated by the navigation filter as a function of the navigation measurements performed by the navigation sensor. Consequently, the at least one condensed measurement is calculated on the one hand as a function of the characteristic elements identified in the images and on the other hand as a function of the a priori estimation of the motion provided by the navigation filter.

In particular embodiments, the method of estimation may further comprise one or more of the following characteristics, taken alone or according to all technically possible combinations.

In particular embodiments, the method of estimation comprises an estimation of the error made in the at least one condensed measurement and an estimation of the relation between the error made in the a priori estimation of said motion and the error made in the at least one condensed measurement, and the navigation filter estimates the motion of the carrier as a function furthermore of the estimation of the error made in the at least one condensed measurement and as a function of the relation between the error made in the a priori estimation of said motion and the error made in the at least one condensed measurement.

Such arrangements make it possible to improve the precision of the estimation. In fact, since the at least one condensed measurement is calculated as a function of an a priori estimation of the motion provided by the navigation filter, and since the navigation filter estimates the motion as a function of the at least one condensed measurement, it will be understood that the error made by the navigation filter in the a priori estimation is reintroduced into said navigation filter by the at least one condensed measurement. Such a reintroduction of the error made may prove to be a problem, and in certain cases it may degrade the precision of the estimation of the motion. Such a degradation is avoided here thanks to the taking account of the estimation of the error made in the at least one condensed measurement and the relation between the error made in the a priori estimation of said motion and the error made in the at least one condensed measurement.

In particular embodiments, the at least one condensed measurement is calculated as a function furthermore of an estimation of the error made in the a priori estimation of the motion.

In particular embodiments, the calculation of the at least one condensed measurement performs a least squares estimation.

In particular embodiments, the navigation filter is a Kalman filter.

In particular embodiments, one determines during the calculation step a condensed measurement representative of a ratio of the distances traveled by the carrier between the times of acquisition of two pairs of images of a triplet of images, as a function of characteristic elements of the images of said triplet representing characteristic elements of the environment which are visible in each of the three images of said triplet.

In particular embodiments, one determines during the calculation step at least one condensed measurement representative of a direction of movement of the carrier between the times of acquisition of a pair of images, as a function of characteristic elements of this pair of images representing characteristic elements of the environment which are visible in each of the two images of this pair.

In particular embodiments, one determines during the calculation step at least one condensed measurement representative of a rotation of the carrier between the times of acquisition of a pair of images, as a function of characteristic elements of this pair of images representing characteristic elements of the environment which are visible in each of the two images of this pair.

In particular embodiments, the a priori estimation of the motion of the carrier consists in an estimation of the rotation of the carrier and/or in an estimation of the direction of translation of the carrier between the times of acquisition of the images.

In particular embodiments, the a priori estimation of the motion of the carrier consists in an estimation of the rotation of the carrier, an estimation of the direction of translation of the carrier between the times of acquisition of the images, as well as an estimation of a ratio of the distances traveled by the carrier between the times of acquisition of successive pairs of images to within a scale factor.

According to a second aspect, the present invention concerns a computer program product comprising a set of program code instructions which, when executed by a processor, carry out a method for estimating the motion of a carrier according to any one of the embodiments of the invention.

According to a third aspect, the present invention concerns a calculation device for a navigation system of a carrier bearing on board at least one navigation sensor and at least one vision sensor, said device comprising means designed to implement a method for estimating the motion of the carrier according to any one of the embodiments of the invention.

BRIEF DESCRIPTION OF THE DRAWINGS

The invention will be better understood upon reading of the following description, given as an example and in no way limiting, and making reference to the figures, which show.

DETAILED DESCRIPTION OF EMBODIMENTS

The present invention concerns a method 10 for estimating the motion of a carrier with respect to an environment 20 in relation to which said carrier is moving.

In the context of the invention, the term "motion" is taken in the broad sense, that is, any parameter relative to the trajectory in position and attitude of the carrier with respect to the environment 20 and/or enabling a prediction of said trajectory. The estimation of the motion comprises the estimation of at least one of the following parameters: position, attitude, velocity, acceleration, rotation, translation.

The motion of the carrier is estimated for purposes of navigation, that is, for purposes of estimation and prediction of the trajectory of the carrier with respect to the environment 20. The invention is applicable to every type of carrier for which one wishes to estimate the motion for purposes of navigation, such as a land, air or space vehicle, a robot, a missile, etc.

The invention is implemented by a navigation system making use of navigation measurements performed by at least one navigation sensor carried aboard the carrier, and images produced by at least one vision sensor likewise carried aboard said carrier.

Each navigation sensor may be of any type, such as a GPS receiver, accelerometer, odometer, gyroscope, Doppler radar, etc. A preferred example of a combination of navigation sensors enabling the estimation of the entire motion of the carrier comprises an inertial unit, measuring the angular velocities and linear accelerations along the three axes of a reference frame tied to the carrier. Said inertial unit is preferably supplemented with a GPS receiver, and/or an altimeter, and/or an odometer, and/or a Doppler radar, etc.

The navigation system comprises a calculation device having for example at least one processor and at least one electronic memory in which a computer program product is stored, in the form of a set of program code instructions to be executed in order to carry out the different steps of the method 10 for estimating the motion of the carrier. In one variant, the control device comprises one or more programmable logic circuits of FPGA, PLD, etc. type, and/or specialized integrated circuits (ASIC) adapted to carry out some or all of said steps of the method 10 of estimation.

In other words, the calculation device comprises a set of means configured by software (specific computer program product) and/or hardware (FPGA, PLD, ASIC, etc.) to carry out the different steps of the method 10 for estimating the motion of the carrier.

The calculation device is either carried aboard the carrier or remote from it, that is, located elsewhere than in the carrier, for example, in a ground station in the case of a carrier of spacecraft type.

The carrier bears on board at least one vision sensor which may be of any type adapted to produce a two-dimensional (2D) image of the environment, such as an optical camera, an infrared camera, an imager radar, etc. A vision sensor is adapted to accomplish the acquisition of images of the environment, for example in the form of an array of pixels providing physical information on the zone of the environment situated in the field of view of this vision sensor. The images are, for example, arrays of 1000×1000 pixels, at a typical frequency between 10 and 100 Hertz.

It should be noted that a monocular vision system (especially as opposed to a stereoscopic one), comprising a single vision sensor, is enough to implement the invention. In the rest of the description, we shall assume without limitation that the carrier bears on board a single vision sensor adapted to provide 2D images of the environment. However, nothing prevents us from having, according to other examples, a carrier bearing on board several vision sensors adapted to provide 2D images of the environment and/or bearing on board at least one vision sensor adapted to provide 3D images of said environment.

According to the invention, the estimation of the motion of the carrier is done by means of an estimation filter, known as a "navigation filter", which receives at its input the information determined from measurements performed by the navigation sensor(s) and by the vision sensor, and combines said information in order to estimate the motion of the carrier.

Figure 1:
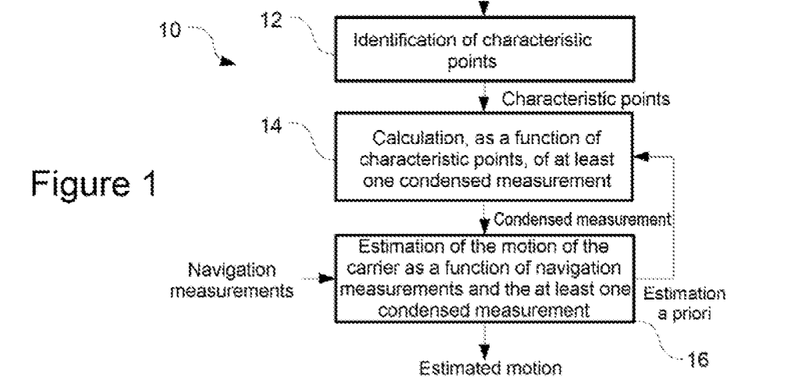
FIG. 1: a diagram representing the main steps of a method for estimating the motion of a carrier according to the invention.

FIG. 1 shows, in very schematic fashion, the main steps of a method 10 of estimation, based on the identification of characteristic points of the environment. As is illustrated in FIG. 1, the method 10 of estimation comprises the steps:
- 12 identification of characteristic points $M_i$ in images acquired by the vision sensor, representing characteristic points of the environment,
- 14 calculation, as a function of characteristic points of the images tracked from one image to another of at least two images acquired at different times, of at least one condensed measurement representative of characteristics of the motion of the carrier during the acquisition of said at least two images,
- 16 estimation of the motion by the navigation filter, which receives at its input the navigation measurements performed by the navigation sensor(s) and the at least one condensed measurement.

Furthermore, as illustrated in FIG. 1, the navigation filter provides an a priori estimation of the motion of the carrier, and the at least one condensed measurement is calculated as a function of the characteristic points and of said a priori estimation of the motion of the carrier.

It should be noted that the a priori estimation of the motion of the carrier may be total or partial. In fact, it is possible to estimate the entire motion of the carrier and to provide it at the input of step 14 for calculating the at least one condensed measurement, or on the other hand to only estimate certain parameters of said motion. In the case described above of a substantially planar observed scene and a trajectory of the carrier substantially orthogonal to said planar scene, the a priori estimation should comprise an estimation of the rotation of the carrier or an estimation of the translation of said carrier to allow the removal of the ambiguity.

Certain steps of the method 10 of estimation may be executed several times. In particular, it will be understood that the initialization of the method 10 of estimation needs to execute at least two times the step 16 of estimation of the motion of the carrier:
- a first execution is needed to obtain the a priori estimation of the motion of the carrier, which is used during step 14 for calculating the at least one condensed measurement,
- a second execution is needed to estimate the motion of the carrier as a function of both the navigation measurements and the at least one condensed measurement.

During the first execution of the estimation step 16, to obtain the a priori estimation of the motion of the carrier, the navigation filter may for example, if no condensed measurement has yet been calculated as a function of the 2D images, consider only the navigation measurements or it may force the at least one condensed measurement at a predetermined value.

Preferably, the steps of the method 10 of estimation are repeated. It will be understood in fact that, especially in the case where it is necessary to remove the ambiguity from the 2D images, the precision of the at least one condensed measurement will be greatly improved by taking into account the a priori estimation of the motion provided by the navigation filter, and that the precision of the a priori estimation will itself be improved by taking into account information coming from the 2D images, through the at least one condensed measurement. Consequently, the precision of the estimated motion will be generally improved by repeating the steps of the method 10 of estimation.

Moreover, the steps of the method 10 of estimation are preferably repeated over the course of time, in order to ensure the tracking of the motion over the course of time by taking into account the images as they are acquired by the vision sensor and the navigation measurements as they are performed by the navigation sensor(s).

Step 12: Identification of Characteristic Points

The identification of characteristic points in an image relies on finding characteristic image zones corresponding to characteristic zones which are presumed to be fixed in the environment and visible in this image. For example, one identifies the characteristic zones in an image by determining patches of adjacent pixels having good properties in terms of image correlation.

Let us assume that there are N characteristic zones identified. The N characteristic zones may correspond to the total number of characteristic zones, or to a subset of all the characteristic zones identified. In the latter case, one will preferably keep the N characteristic zones for which a geometrical criterion (the characteristic zones are distributed substantially uniformly in the image, advantageously not too close to the edges of the image) and/or a correlation criterion (the N characteristic zones which have the best correlation properties) is verified.

One tracks these N characteristic zones from one image to another, for example, by image correlation utilizing the good correlation properties of the patches of pixels representing these characteristic zones. One associates with each characteristic zone a point in the image, known as the "characteristic point of the image" $M_i$, i being contained between 1 and N. The characteristic point $M_i$ of the image is, for example, the radiometric or geometrical center of mass of the patch of pixels representing this characteristic zone, or a particular point of this patch of pixels. Each characteristic point $M_i$ of an image represents a characteristic point $M'_i$ of the environment, presumed to be fixed in relation to the environment.

Step 14: Calculation of at Least One Condensed Measurement

The method 10 utilizes at least two images of the environment, acquired at different times, to calculate at least one condensed measurement representative of characteristics of the motion of the carrier between the times of acquisition of said at least two images. In other words, the at least one condensed measurement corresponds to an at least partial estimation of the motion of said carrier between the times of acquisition of said at least two images in question.

In the rest of the description we shall assume without limitation that the at least one condensed measurement is calculated as a function of characteristic points identified in a triplet of images. However, according to other examples, nothing prevents us from considering a different number of images (≥2) to calculate the at least one condensed measurement.

We shall now describe nonlimiting examples of condensed measurements which may be calculated from characteristic points $M_i$ of the image in each of the images of the triplet of images.

It will be understood that the conventions considered below, for purposes of the description of embodiments of the invention, are not limiting for the invention, which could be described in equivalent manner by adopting other conventions without the invention being modified in its principle.

Let us assume, without limitation and for purposes of clarity of the disclosure, that the times of acquisition of the images are multiples of a constant period of time $\Delta T$. Given an initial time of acquisition $t_0$, it will be understood that the image of rank n is the image taken at the time $t_n = t_0 + n \cdot \Delta T$ which shall be denoted as "time n". In general fashion, it will be understood that if the index n of a variable $W_n$ refers to time, $W_n$ corresponds to the value of that variable $W(t)$ at the time $t = t_0 + n \cdot \Delta T$.

In the rest of the description we shall assume that the current time is n. Among the set of the images taken prior to time n, the triplet of images is composed of three images $I_{n1}$, $I_{n2}$, $I_{n3}$ (n1<n2<n3), known as "registering images". The registering images are not necessarily images acquired successively by the vision sensor (that is, they are not necessarily spaced out in time by the period of time $\Delta T$), and they are preferably images selected from among the set of the images acquired by said vision sensor in order to make sure, for example, that the carrier has moved between said times of acquisition of said images $I_{n1}$, $I_{n2}$, $I_{n3}$ (see, for example, the patent FR 2964774 B1).

Figure 2:
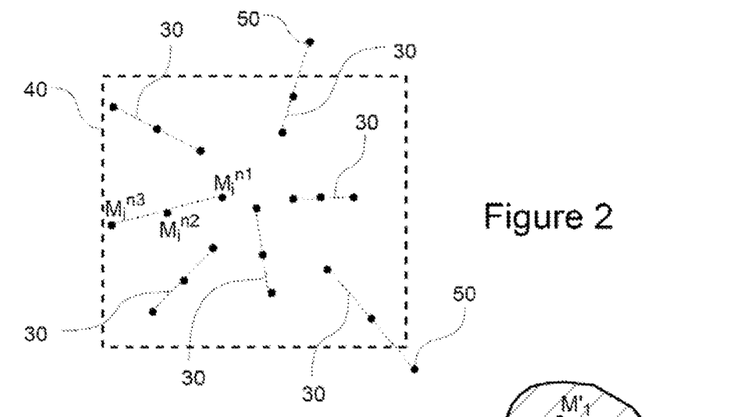
FIG. 2: a schematic representation, in the focal plane of an observation instrument, of virtual traces formed by characteristic points tracked in several images acquired consecutively by said vision sensor.

As we have seen, the characteristic points $M_i$ move from one image to another when the carrier is in motion. The movement of the characteristic points $M_i$, 1≤i≤N, from one image to another, is representative of the motion in translation and in rotation of the carrier. The movement of the characteristic points $M_i$ from one image to another may be represented in the form of virtual traces 30 illustrating the trajectories of these characteristic points in the focal plane 40 of the vision sensor.

Because of the movement of the carrier with respect to the environment, in translation and/or in rotation, the characteristic zones identified in a first image are not necessarily visible in the following images. It will thus be understood that certain characteristic zones might "vanish" from one image to another, while new characteristic zones might be identified.

FIG. 2 shows an example of such traces 30 in the focal plane 40 of the vision sensor, between the times of acquisition n1 and n3.

We denote by $M_i^{n1}$, $M_i^{n2}$ and $M_i^{n3}$ the positions of the characteristic point $M_i$ in each of the images $I_{n1}$, $I_{n2}$ and $I_{n3}$. The virtual trace 30 formed by the movement of the characteristic point $M_i$ is formed by the positions $Mi^{n1}$, $Mi^{n2}$ and $Mi^{n3}$ represented in the focal plane 40 of the vision sensor.

As we have seen above, because of the movement of the carrier certain characteristic points $M_i$ will vanish from one image to another. This phenomenon is illustrated by the presence of characteristic points outside of the focal plane 40 in FIG. 2 (denoted in this figure by the reference 50). This representation of characteristic points of the image outside of the focal plane 40 is virtual, since the characteristic points $M'_i$ outside the field of vision of the observation instrument do not appear in the image.

We shall consider at a first time, pairs of registering images of the triplet, and calculate from these pairs condensed measurements, at least one of which is used by the navigation filter of the navigation system.

Thus, we shall consider one pair of images among the triplet of registering images, such as the images $I_{n1}$, $I_{n2}$ and we shall consider characteristic points n representing characteristic points $M'_i$ of the environment which are visible in the two images of this pair.

At a first time, we shall express, based on positions $M_i^{n1}$ and $M_i^{n2}$ of the points M respectively in the registering image $I_{n1}$ and in the registering image $I_{n2}$, the relative pose between said two registering images $I_{n1}$ and $I_{n2}$.

By "relative pose" is meant the variation in the position and the attitude of the vision sensor (and thus of the carrier, the vision sensor being assumed to be fixed with respect to the carrier or with a known orientation at every moment of time with respect to said carrier) in relation to the environment 20 between the two times n1 and n2 of acquisition of the registering images $I_{n1}$ and $I_{n2}$.

In the rest of the description, unless otherwise indicated, we shall assume the reference frame (O, X, Y, Z) associated with the vision sensor, for example, defined by considering the reference point O as being the center of the focal plane of the vision sensor, Z as being the optical axis of said vision sensor, and (X, Y) as being the focal plane of the vision sensor.

The relative pose of the vision sensor is expressed, for example, in the reference frame associated with the vision sensor, such as it is oriented at the time n2, denoted as $R_{n2}$. Different representations are possible for the relative pose, and we shall assume that said relative pose is expressed in the form $(P_{n1}P_{n2} \text{ m } \delta\theta_{n1n2})$, where:

$P_{ni}$ is the position of the origin O of the reference frame $R_{ni}$, ni being equal to n1 or n2, $P_{n1}P_{n2}$ is the vector formed by $P_{n1}$ and $P_{n2}$, of origin $P_{n1}$, $\delta\theta_{n1n2}$ is the transition matrix which transforms the coordinates of a vector in the reference frame $R_{n1}$ into the coordinates of this vector in the reference frame $R_{n2}$.

Figure 3:
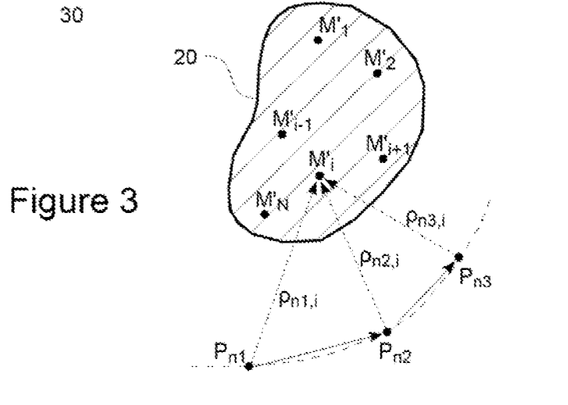
FIG. 3: a schematic representation of the movement of a carrier with respect to an environment, illustrating certain definitions employed in the description.

FIG. 3 shows in very schematic fashion the positions $P_{n1}$, $P_{n2}$ and $P_{n3}$ of the origin O at the times n1, n2 and n3, as well as the environment 20 in relation to which the carrier is moving and characteristic points $M'_i$ of this environment.

For any characteristic point $M'_i$ of the environment, we have the following vectorial relation:

$$P_{n1}P_{n2} = P_{n1}M'_i - P_{n2}M'_i \quad (1)$$

The expression (1) may be expressed in equivalent manner in the following normalized form:

$$\frac{P_{n1}P_{n2}}{\|P_{n1}P_{n2}\|} = \frac{\|P_{n1}M'_i\|}{\|P_{n1}P_{n2}\|} \cdot \frac{P_{n1}M'_i}{\|P_{n1}M'_i\|} - \frac{\|P_{n2}M'_i\|}{\|P_{n1}P_{n2}\|} \cdot \frac{P_{n2}M'_i}{\|P_{n2}M'_i\|} \qquad (2)$$

where we denote as $\|AB\|$ the norm of the vector AB, that is, the distance between the points A and B.

Denoting by:
- $u_{n1n2}$ the unit vector (that is, the vector with norm equal to 1), collinear with the vector $P_{n1}P_{n2}$,
- $u_{n1,i}$ the unit vector of the line of sight of the vision sensor toward the characteristic point $M'_i$ of the environment 20 at the time n1,
- $u_{n2,i}$ the unit vector of the line of sight of the vision sensor toward the characteristic point $M'_i$ of the environment 20 at the time n2,
- $\rho_{nj,i}$ the distance between the characteristic point $M'_i$ and the position $P_{nj}$ of the carrier at the time of acquisition nj (j equal to 1 or 2),
- $z_{nj,i}$ the ratio between the distance $\rho_{nj,i}$ and the distance $\|P_{n1}P_{n2}\|$ traveled by the reference point O between the times n1 and n2, the expression (2) can be expressed in the following equivalent form:

$$u_{n1n2} = z_{n1,i} \cdot u_{n1,i} - z_{n2,i} \cdot u_{n2,i} \qquad (3)$$

The vectorial relation (3) can be expressed in terms of coordinates in the reference frame $R_{n2}$ at the time n2 in the following form:

$$u_{n1n2}|R_{n2} = z_{n1,i} \cdot \delta\theta_{n1n2} \cdot u_{n1,i}|R_{n1} - z_{n2,i} \cdot u_{n2,i}|R_{n2} \qquad (4)$$

where:
- $u_{n1n2}|R_{n2}$ and $u_{n2,i}|R_{n2}$ denote the coordinates of the unit vectors respectively $u_{n1n2}$ and $u_{n2,i}$ in the reference frame $R_{n2}$,
- $u_{n1,i}|R_{n1}$ denotes the coordinates of the unit vector $u_{n1,i}$ in the reference frame $R_{n1}$.

It will be understood that each characteristic point $M'_i$ visible in both the registering image $I_{n1}$ and the registering image $I_{n2}$ may result in this type of vectorial relation (4).

In the expression (4), and for each characteristic point $M'_i$ of the environment 20, the terms $u_{n1n2}|R_{n2}$, $\delta\theta_{n1n2}$, $z_{n1,i}$ and $z_{n2,i}$ represent terms not known a priori, whereas the terms $u_{n1,i}|R_{n1}$ and $u_{n2,i}|R_{n2}$, which are the viewing lines of these characteristic points in the frame of the vision sensor, can be expressed directly from known positions $M_i^{n1}$ and $M_i^{n2}$ of the characteristic points $M_i$ associated with the characteristic points $M'_i$ of the environment respectively in the images $I_{n1}$ and $I_{n2}$.

In the rest of the description, we shall denote as the "normalized relative pose" the set of the parameters $(u_{n1n2}|R_{n2}, \delta\theta_{n1n2})$ (normalized in the sense that the unit vector $u_{n1n2}|R_{n2}$ corresponds only to the direction of the vector $P_{n1}P_{n2}$ with no indication as to the distance between $P_{n1}$ and $P_{n2}$). A normalized relative pose thus comprises 5 independent scalar parameters: two parameters describing the direction of the unit vector $u_{n1n2}|R_{n2}$ (that is, the direction of the translation of the carrier between the times $t_{n1}$ and $t_{n2}$) and three parameters (Euler angles or normalized quaternion) giving the transition matrix $\delta\theta_{n1n2}$ (that is, the rotation of the carrier between the times $t_{n1}$ and $t_{n2}$).

It will be understood that one has for each characteristic point $M'_i$ visible in the registering images $I_{n1}$ and $I_{n2}$ one vectorial relation (4) formed by 3 scalar relations. These 3 scalar relations link the positions $M_i^{n1}$ and $M_i^{n2}$, the 5 parameters of normalized relative pose to be determined, and the two ratios of distances $z_{n1,i}$ and $z_{n2,i}$ also to be determined.

Because of the normalization constraints $\|u_{n1n2}|R_{n2}\|=1$, the preceding 3 scalar relations in fact lead to 2 independent scalar relations.

On the other hand, the ratios of distance $z_{n1,i}$ and $z_{n1,i}$ are not independent, but instead linked by the relation:

$$z_{n2,i} = (z_{n1,i} \cdot \delta\theta_{n1n2} \cdot u_{n1,i}|R_{n1} - u_{n1n2}|R_{n2}) \cdot u_{n2,i}|R_{n2} \qquad (5)$$

obtained by applying the scalar product of the vector $u_{n2,i}|R_{n2}$ to the two members of equation (4). Consequently, it will be understood that, for each characteristic point a single one of the two ratios of distance $z_{n1,i}$ and $z_{n2,i}$ constitutes an independent parameter.

The 5 parameters of normalized relative pose are the same for all the characteristic points $M'_i$ visible in the two registering images $I_{n1}$ and $I_{n2}$, whereas the ratios of distance $z_{n1,i}$ and $z_{n2,i}$ linked by the relation (5), depend on the characteristic point $M'_i$ in question.

Considering that we have $N_{12}$ characteristic points $M'_i$ visible in the two images $I_{n1}$ and $I_{n2}$, we then have $2 \times N_{12}$ independent scalar relations (the $N_{12}$ vectorial relations (4)) for $(N_{12}+5)$ unknowns (5 parameters of normalized relative pose and $N_{12}$ independent ratios of distance). It will thus be understood that the normalized relative pose and the ratios of distance may be estimated once we have $N_{12}=5$ characteristic points $M'_i$ of the environment 20 visible in the two images $I_{n1}$ and $I_{n2}$.

It is advantageous to consider a number of characteristic points $M'_i$ greater than 5, even significantly greater than 5, to improve the precision of the estimation of the condensed measurements, which is always the case in practice, since the number of characteristic points in a typical environment image of dimension 1000×1000 pixels may easily amount to several hundreds. When the information coming from the images and provided to the navigation filter is limited to only the condensed measurements, one may advantageously consider a number of characteristic points more substantial than in the prior art, without increasing the complexity of the calculations performed by said navigation filter. In the prior art, as the number of states and measurements increases, the navigation filter is directly proportional to the number N of characteristic zones kept, whereas this is no longer the case with the invention.

The estimation of the normalized relative pose between the images La and Le and the ratios of distance is done for example by solving the system made up of the set of the $2 \cdot N_{12}$ scalar relations associated with the $N_{12}$ characteristic points $M'_i$ of the environment. This solving can be done by any method known to the skilled person, preferably by using a nonlinear technique of estimation by least squares. In fact, this type of technique allows also estimating the covariance matrix $C_{n1n2}$ of the errors of estimation of these variables (normalized relative pose and ratios of distance), while also minimizing it.

The solving of the system made up of the set of the $2 \cdot N_{12}$ aforementioned scalar relations makes it possible to obtain a condensed measurement based on information contained in the images $I_{n1}$ and $I_{n2}$, representative of the normalized relative pose between the images $I_{n1}$ and $I_{n2}$, as well as the covariance matrix of the errors of estimation of this normalized relative pose, which matrix is extracted from the covariance matrix $C_{n1n2}$.

One may optionally restrict this condensed measurement to the estimation of the direction of movement of the carrier between the images $I_{n1}$ and $I_{n2}$, this condensed measurement being then the estimation of the vector $u_{n1n2}|R_{n2}$, by making the hypothesis that the variations in attitude are estimated and/or measured without calling upon the images acquired by the vision sensor (for example, by using only the navigation system). Likewise, it is possible to restrict this condensed measurement to the estimation of the rotation of the carrier between the images $I_{n1}$ and $I_{n2}$, this condensed measurement being then the estimation of the transition matrix $\delta\theta_{n1n2}$.

During the calculation step 14, one preferably performs the same type of processing for the pair of registering images $I_{n2}$ and $I_{n3}$ as that done for the pair of registering images $I_{n1}$ and L. This processing is done based on the following equations, drawn up for each of $N_{23}$ characteristic points $M'_i$ common to the two registering images $I_{n2}$ and $I_{n3}$:

$$u_{n2n3}|R_{n3} = w_{n2,i} \cdot \delta\theta_{n2n3} \cdot u_{n2,i}|R_{n2} - w_{n3,i} \cdot u_{n3,i}|R_{n3} \qquad (6)$$

where:
- $u_{n2n3}|R_{n3}$ and $u_{n3,i}|R_{n3}$ denote the coordinates of the unit vectors, respectively $u_{n2n3}$ (collinear with the vector $P_{n2}P_{n3}$) and $u_{n3,i}$ (collinear with the vector $P_{n3}M'_i$) in the reference frame $R_{n3}$,
- $u_{n2,i}|R_{n2}$ denotes the coordinates of the unit vector $u_{n2,i}$ (collinear with the vector $P_{n2}M'_i$) in the reference frame $R_{n2}$,
- $\rho_{nj,i}$ the distance between the characteristic point $M'_i$ and the position $P_{nj}$ of the carrier at the time of acquisition nj (j equal to 2 or 3),
- $w_{nj,i}$ the ratio between the distance $\rho_{nj,i}$ and the distance $\|P_{n2}P_{n3}\|$ traveled by the reference point O between the times n2 and n3,
- $\delta\theta_{n2n3}$ is the transition matrix which transforms the coordinates of a vector in the reference frame $R_{n2}$ into the coordinates of this vector in the reference frame $R_{n3}$.

As for the pair of registering images $(I_{n1}, I_{n2})$, we estimate, as a function of the positions $M_i^{n2}$ and $M_i^{n3}$ of the points $M_i$ respectively in the images $I_{n2}$ and $I_{n3}$, the 5 parameters of normalized relative pose between the times n2 and n3, as well as the two ratios of distances $w_{n2,i}$ and $w_{n3,i}$.

This estimation of the normalized relative pose and the ratios of distance between the times n2 and n3 is done by any method known to the skilled person, preferably by using a nonlinear technique of estimation by least squares based on equations (6). Preferably, one also estimates the covariance matrix $C_{n2n3}$ of the errors of estimation of these variables.

This estimation makes it possible to obtain a condensed measurement based on information contained in the images $I_{n2}$ and $I_{n3}$, representative of the normalized relative pose between the images $I_{n2}$ and $I_{n3}$, as well as the covariance matrix of the errors of estimation of this normalized relative pose, which matrix is extracted from the covariance matrix $C_{n2n3}$.

It should be noted that nothing prevents us, according to certain embodiments, from restricting this condensed measurement to the estimation of the direction of movement of the carrier between the images $I_{n2}$ and $I_{n3}$, this condensed measurement being then the estimation of the vector $u_{n2n3}|R_{n3}$. Likewise, it is possible to restrict this condensed measurement to the estimation of the rotation of the carrier between the images $I_{n2}$ and $I_{n3}$, this condensed measurement being then the estimation of the transition matrix $\delta\theta_{n2n3}$.

It may be noted that, besides the condensed measurements obtained by estimation of the normalized relative poses between the image pairs $(I_{n1}, I_{n2})$ and $(I_{n2}, I_{n3})$ of the triplet of images in question, one could likewise form condensed measurements based on the estimation of the normalized relative pose between the image pairs $(I_{n1}, I_{n3})$. However, the condensed measurement so formed does not provide supplemental information as compared to the previous ones.

During the calculation step 14, one determines a set of characteristic points $M'_i$ which are visible in the three registering images $I_{n1}$, $I_{n2}$, $I_{n3}$ of the triplet. We denote by $N_{123}$ the number of characteristic points $M'_i$ considered that are visible in the three registering images of the triplet.

For these characteristic points $M'_i$, the following relation is verified, by definition of the parameters $\rho_{n2,i}$:

$$\rho_{n2,i} = w_{n2,i} \cdot \|P_{n2}P_{n3}\| = z_{n2,i} \cdot \|P_{n1}P_{n2}\| \qquad (7)$$

The estimation of the ratios of distances $w_{n2,i}$ and $z_{n2,i}$ as explained previously thus makes it possible to determine, based on equation (7), another type of condensed measurement, associated with the triplet of images $(I_{n1}, I_{n2}, I_{n3})$, representative of the ratio of the distances traveled $\delta = \|P_{n2}P_{n3}\|/\|P_{n1}P_{n2}\|$. This condensed measurement representative of the ratio of distances traveled is for example an estimation of the value of the ratio $\delta$, or an estimation of the value of a function of this ratio, such as $\arctan(\delta)$.

It should be noted that this condensed measurement, representative of the ratio of the distances traveled, may be calculated at the same time as the other condensed measurements previously described by carrying out a nonlinear technique of estimation by least squares of these measurements based on equations (4), (6), (7), so that one may simultaneously estimate the covariance matrix of the errors of estimation associated with the set of condensed measurements which will be used by the navigation filter.

It will thus be understood that, during the calculation step 14, different condensed measurements may be calculated, in particular a measurement representative of the ratio of the distances traveled, measurements representative of the normalized relative poses (optionally restricted to condensed measurements representative of the direction of movement of the carrier). The quantity of information resulting from the images to be processed by the navigation filter is advantageously limited to the condensed measurements, and is consequently very reduced as compared to the prior art. In fact, the condensed measurement representative of the ratio of the distances traveled basically consists in a scalar parameter, and each condensed measurement representative of a normalized relative pose basically consists in 5 scalar parameters, or a total of 11 scalar parameters representative of the 11 degrees of freedom of the problem.

Step 16: Estimation of the Motion of the Carrier

During the estimation step 16, the motion of the carrier is estimated by means of the navigation filter which receives at its input navigation measurements performed by the navigation sensor(s) and at least one condensed measurement. In other words, the navigation filter performs a merging between, on the one hand, navigation measurements and, on the other hand, at least one condensed measurement determined from a triplet of images acquired by the vision sensor.

The estimation of the motion of the carrier is done preferably at least as a function of the condensed measurement representative of the ratio of the distances traveled, corresponding to the triplet of images $(I_{n1}, I_{n2}, I_{n3})$. The utilization, at the same time, of the condensed measurement representative of the ratio of the distances traveled and condensed measurements representative of the normalized relative poses corresponds to a preferred embodiment of the method 10 of estimation.

The estimation of the motion of the carrier implements a navigation filter for which many implementations of the navigation filter are possible, such as a Kalman filter, an extended Kalman filter, an information filter, a particle filter, a Bayesian filter, etc. Such navigation filters are assumed to be known to the skilled person and one may refer in particular to the references of scientific publications previously cited.

In very general manner, these filters propagate over the course of time an estimation of the state of the carrier as well as the covariance matrix of the error of estimation of this state based on a model of variation over time of the state, and they readjust this estimation and the associated covariance matrix as a function of the measurements and the covariance of the errors of measurements which are provided to it, on the assumption that these measurements are dependent on the state of the carrier.

The vector of states of the navigation filter comprises, in particular, the state of the carrier at the time n (that is, the motion which one seeks to estimate), which is denoted as $X_n$. The state $X_n$ preferably comprises at least 6 parameters: 3 parameters representative of the position of a reference frame tied to the carrier in a reference frame external to the carrier, which may be any frame tied in deterministic manner to the environment, and 3 parameters representative of the attitude of said reference frame tied to the carrier in said reference frame external to the carrier.

Preferably, the vector of states of the navigation filter is augmented, as compared to the prior art, to include the state of the carrier at the times n1, n2 and n3, denoted respectively as $X_{n1}$, $X_{n2}$ and $X_{n3}$. For example, the states $X_{n1}$, $X_{n2}$, $X_{n3}$ contain the six parameters of position and attitude of the reference frame of the carrier respectively at the times n1, n2, n3.

According to the invention, the measurements provided to the navigation filter to readjust (or update) the estimations of the states of the carrier comprise the navigation measurements performed by the navigation sensor(s) and at least one condensed measurement. In a preferred embodiment, the condensed measurements provided to the navigation filter comprise, starting at the time n2, the estimation of the normalized relative pose (or the estimation of the direction of movement) between the times n1 and n2, and starting at the time n3, on the one hand, the estimation of the normalized relative pose (or the estimation of the direction of movement) between the times n2 and n3, and on the other hand the measurement of the ratio of distances traveled respectively between the times n1 and n2, and between the times n2 and n3.

It will be noted that, by definition, the measurements of normalized relative pose and of the ratio of the distances traveled are expressed simply and in analytical manner as a function of position and attitude parameters included in the states $X_{n1}$, $X_{n2}$, $X_{n3}$ of the augmented vector of states. This relation between condensed measurements and states $X_{n1}$, $X_{n2}$, $X_{n3}$ is a model of measurements which is classically used by the augmented navigation filter (Kalman filter, for example).

Preferably, when one has previously determined the covariances of the errors as to the estimation of all or some of the condensed measurements (estimation of the ratio of distances traveled, estimations of normalized relative pose or estimations of direction of movement), these are likewise provided to the navigation filter, in addition to the navigation measurements and the condensed measurements, in order to be processed in classical manner by the navigation filter (Kalman filter, for example).

The hybridization of the navigation measurements with the condensed measurement makes it possible, in certain practical instances, to significantly improve the precision of the estimation of the motion of the carrier.

For example, let us assume that the movement of the carrier is rectilinear, with an acceleration $a_1$ substantially constant between the times n1 and n2, and with an acceleration $a_2$ substantially constant between the times n2 and n3 (the acceleration $a_2$ possibly being equal to the acceleration $a_1$, but the accelerations $a_1$ and $a_2$ not being both zero). This case is representative, albeit highly simplified, of a scenario of landing of the carrier on a relief, a scenario in which the accelerations $a_1$ and $a_2$ are negative.

Simple kinematic calculations make it possible to establish the following relations:

$$\|P_{n1}P_{n2}\| = v_1 \cdot \Delta t_{12} + \tfrac{1}{2} \cdot a_1 \cdot (\Delta t_{12})^2 \tag{8a}$$

$$\|P_{n2}P_{n3}\| = (v_1 + a_1 \cdot \Delta t_{12}) \cdot \Delta t_{23} + \tfrac{1}{2} \cdot a_2 \cdot (\Delta t_{23})^2 \tag{8b}$$

where $\Delta t_{12} = t_{n2} - t_{n1}$ and $\Delta t_{23} = t_{n3} - t_{n2}$, and $v_1$ is the velocity of the carrier with respect to the environment at the time n1.

One deduces from relations (8a) and (8b) that:

$$v_1 = \frac{1/2 \cdot \delta \cdot a_1 \cdot (\Delta t_{12})^2 - a_1 \cdot \Delta t_{12} \cdot \Delta t_{23} - 1/2 \cdot a_2 \cdot (\Delta t_{23})^2}{\Delta t_{23} - \delta \cdot \Delta t_{12}} \tag{9}$$

The fact that the motion is accelerated means that the ratio $\delta$ of the distances traveled between respectively the times n2 and n3, and the times n1 and n2, is different from the ratio $\Delta t_{23}/\Delta t_{12}$ (the carrier is not moving at constant velocity, on average, between the times n1 and n3). Thus, the denominator of expression (9) is not zero and one sees that the knowledge of the condensed measurement representative of the ratio $\delta$ of the distances traveled, coupled with a knowledge of the acceleration, makes it possible to estimate the velocity $v_1$ of the carrier.

The advantage offered by taking the images into account in the navigation system is that the knowledge of the velocity $v_1$ is not obtained by integrating the acceleration whose measurement is burdened with errors, which prevents deviations and thus allows better precision for the estimation of the state $X_n$ of the carrier, and thus of its motion with respect to the environment 20.

The taking into account of the condensed measurements likewise proves to be advantageous in the case where the navigation system provides intermittent assistance (for example a GPS satellite positioning system or other system in an urban canyon, or an odometer system in a slippery environment).

As an example, we shall assume that the navigation system is operational between the times n1 and n2, but no longer operational between the times n2 and n3. The navigation system provides a rather precise estimation of the movement $P_{n1}P_{n2}$, and thus of the distance $\|P_{n1}P_{n2}\|$ traveled by the carrier between the times n1 and n2, but it no longer provides a reliable estimation between the times n2 and n3. The condensed measurement representative of the ratio of the distances traveled at the time n3 makes it possible to estimate, as a function of the estimation of the distance traveled $\|P_{n1}P_{n2}\|$ provided by the navigation system, the distance traveled $\|P_{n2}P_{n3}\|$ the times n2 and n3. The estimation of the distance traveled $\|P_{n2}P_{n3}\|$, combined with the condensed measurement representative of the normalized relative pose between the times n2 and n3, makes it possible to estimate the movement $P_{n2}P_{n3}$. One will thus understand that the vision system can substitute for the lacking navigation system between the times n2 and n3. Step by step, one can thus propagate the estimation of the movements performed, and thus the state of the carrier in position and in attitude, until the navigation system is again operational.

The method 10 is applied sequentially to the later times after n3 using the same principles. For example, at a time n4 later than n3, one applies the method to the registering images $I_{n2}$, $I_{n3}$, $I_{n4}$, by replacing in the vector of states of the navigation filter the state $X_{n1}$ with the state $X_{n4}$ of the carrier at the time n4. It will be noted that between the times n3 and n4 the visual information processed by the augmented navigation filter is advantageously limited to the condensed measurements determined from the registering images $I_{n1}$, $I_{n2}$ and $I_{n3}$.

Preferred Embodiment of the Method 10 of Estimation

In the rest of the description, we shall describe a preferred embodiment of the method 10 of estimation, in which the calculation step 14 of the at least one condensed measurement performs an estimation in the sense of least squares, and in which the estimation step 16 implements a navigation filter of Kalman filter type. Since the problem is highly nonlinear, the equations given below are "error equations". The navigation filter is thus advantageously a nonlinear Kalman filter of extended type ("Extended Kalman Filter" in the English-language literature) or unscented type ("unscented Kalman Filter" in the English-language literature).

As indicated above, the at least one condensed measurement is calculated as a function of both characteristic points and an a priori estimation of the motion provided by the navigation filter. In the rest of the description, we shall denote as $Z_k$ a condensed measurement vector calculated at a time k during the calculation step 14. The condensed measurement vector $Z_k$ comprises at least one condensed measurement, preferably selected from among the following possible condensed measurements:
- condensed measurement corresponding to the ratio of the distances traveled by the carrier between the times of acquisition of two pairs of images of a triplet of images,
- condensed measurement corresponding to the direction of movement of the carrier between the times of acquisition of a pair of images,
- condensed measurement corresponding to the rotation of the carrier between the times of acquisition of a pair of images.

In a more general manner, we have seen that all of the above condensed measurements were representative of the 11 degrees of freedom of the problem, and the condensed measurement vector $Z_k$ should contain at least one condensed measurement representative of all or some of these 11 degrees of freedom.

The a priori estimation provided by the navigation filter at the time k is denoted hereinafter by $\hat{S}$. As previously stated, the a priori estimation of the motion of the carrier may be total or partial. In fact, it is possible to estimate the entire motion of the carrier and provide this at the input of the calculation step 14 of the at least one condensed measurement, or on the other hand to only estimate certain parameters of said motion. In the rest of the description, we shall assume without limitation that the a priori estimation $\hat{S}$ corresponds to an estimation of the rotation of the carrier, said rotation of the carrier being denoted hereafter as S.

Preferably, the navigation filter also provides, for the calculation of the condensed measurement vector $Z_k$, the covariance matrix $P_{ss}$, of the error made in the a priori estimation $\hat{S}$.

In the rest of the description, we shall assume that the information obtained from the characteristic points, hereinafter denoted as Y, is tied to the condensed measurement vector $Z_k$ by the following expression:

$$Y = HZ_k + V \qquad (10)$$

where the vector V represents a measurement noise.

We shall also assume that the rotation S of the carrier is tied to the condensed measurement vector $Z_k$ by the following expression:

$$S = S_x Z_k \qquad (11)$$

The estimation $\hat{Z}_k$ of the condensed measurement vector, in the sense of least squares, calculated in the course of the calculation step 14, is then given by the following expression:

$$\hat{Z}_k = (H^\tau \Lambda_v H + S_x^\tau P_{ss}^{-1} S_x)^{-1} (H^\tau \Lambda_v Y + S_x^\tau P_{ss}^{-1} \hat{S}) \qquad (12)$$

Where $\Lambda_v$ is the matrix of information associated with the vector Y

Preferably, the covariance matrix $P_{zz}$ of the error made in the estimation $\hat{Z}_k$ of the condensed measurement vector is likewise estimated, for example, by the following expression:

$$P_{zz} = (H^\tau \Lambda_v H + S_x^\tau P_{ss}^{-1} S_x)^{-1} \qquad (13)$$

As indicated above, we shall assume without limitation that the navigation filter is a Kalman filter. In conventional manner, the state of the navigation filter is represented, at a time k, by a vector $X_k$ of states, whose estimation, hereinafter denoted as $\hat{X}_k$, corresponds to the estimation of the motion of the carrier at the time k.

A Kalman filter in conventional manner comprises two main steps: an updating step and a prediction step.

The updating step of the navigation filter is primarily governed by the following expressions:

$$K_k = P_{k|k-1} H_k (R_k + H_k P_{k|k-1} H_k^\tau)^{-1} \qquad (14a)$$

$$\hat{X}_k = \hat{X}_{k|k-1} - K_k (H_k \hat{X}_{k|k-1} - \hat{Z}_k) \qquad (14b)$$

$$P_k = (I - K_k H_k) P_{k|k-1} \qquad (14c)$$

where:
- $H_k$ is the matrix which ties the vector $X_k$ of states of the navigation filter to the condensed measurement vector $Z_k$,
- $P_k$ is the covariance matrix of the error made in the estimation $\hat{X}_k$ of the vector of states of the navigation filter,
- $R_k$ is the covariance matrix of the measurement noise affecting the estimation $\hat{Z}_k$ of the condensed measurement vector,
- $\hat{X}_{k|k-1}$ is the prediction of the vector $X_k$ of states at the time k based on the estimation $\hat{X}_{k-1}$ of the vector of states at the time (k−1),
- I is the identity matrix,
- $P_{k|k-1}$ is the prediction of the covariance matrix $P_k$ at the time k based on the covariance matrix $P_{k-1}$ tat at the time (k−1)

The prediction step of the navigation filter is primarily governed by the following expressions:

$$\hat{X}_{k|k-1} = F_k \hat{X}_{k-1} U_{k-1} \qquad (15a)$$

$$P_{k|k-1} = F_k P_{k-1} F_k^\tau Q_k \qquad (15b)$$

where:
- $F_k$ is the matrix tying the vector $X_{k-1}$ of states of the navigation filter to the vector $X_k$ of states of said navigation filter, $U_{k-1}$ is a vector of navigation measurements at the time (k−1), $Q_k$ is the covariance matrix of the noise of the process.

Considering that the rotation S of the carrier is tied to the vector $X_k$ of states by the following expression:

$$S = H_s X_k \qquad (16)$$

the a priori estimation $\hat{S}$ and its covariance matrix $P_{ss}$ are then calculated for example by the following expressions:

$$\hat{S} = H_s \hat{X}_{k|k-1} \qquad (17a)$$

$$P_{ss} = H_s P_{k|k-1} H_s^\tau \qquad (17b)$$

According to a particularly simple exemplary embodiment, the covariance matrix $R_k$ of the measurement noise affecting the estimation $\hat{Z}_k$ of the condensed measurement vector is assumed to be equal to the covariance matrix $P_{zz}$ of the error made in the estimation of the condensed measurement vector. However, one drawback to such an approach lies in the fact that the error made by the navigation filter in the a priori estimation of the motion of the carrier is reintroduced into said navigation filter through the estimation $\hat{Z}_k$ of the condensed measurement vector. Such a reintroducing of the error made may prove to be problematical, and in certain cases it may degrade the precision of the final estimation of the motion provided by the navigation filter.

In preferred embodiments, the method 10 of estimation advantageously comprises an estimation of the relation between the error made in the a priori estimation S of said motion and the error made in the estimation $\hat{Z}_k$ of the condensed measurement vector. Moreover, the navigation filter then estimates the motion of the carrier as a function furthermore of the error made in the estimation $\hat{Z}_k$ of the condensed measurement vector (covariance matrix $P_{zz}$) and as a function of the relation between the error made in the a priori estimation $\hat{S}$ of said motion and the error made in the estimation $\hat{Z}_k$ of the condensed measurement vector.

For example, the relation between the error made in the a priori estimation $\hat{S}$ of said motion and the error made in the estimation $\hat{Z}_k$ of the condensed measurement vector, hereinafter denoted as the matrix of influence B, is estimated by the following expression:

$$B(H^\tau \Lambda_v H + S_x^\tau P_{ss}^{-1} S_x)^{-1} S_x^\tau P_{ss}^{-1} \qquad (18)$$

Preferably, the estimation of the motion taking into account the matrix of influence B is realized, for example, by replacing, for the updating step of the navigation filter, the matrices $R_k$ and $H_k$ with respective matrices $\tilde{R}_k$ and $\tilde{H}_k$, calculated by the following expressions:

$$\tilde{R}_k = P_{zz} - B P_{ss} B^\tau \qquad (19a)$$

$$\tilde{H}_k = H_k - B \qquad (19b)$$

so that the expressions which govern the updating step of the navigation filter become:

$$K_k = P_{k|k-1} \tilde{H}_k (\tilde{R}_k + \tilde{H}_k P_{k|k-1} \tilde{H}_k^\tau)^{-1} \qquad (20a)$$

$$\hat{X}_k = \hat{X}_{k|k-1} - K_k (\tilde{H}_k \hat{X}_{k|k-1} - \hat{Z}_k) \qquad (20b)$$

$$P_k = (I - K_k \tilde{H}_k) P_{k|k-1} \qquad (20c)$$

In this way, the precision of the estimation is improved by taking into account, in the equations of the navigation filter, the fact that the estimation $\hat{Z}_k$ of the condensed measurement vector is calculated as a function of an a priori estimation of the motion provided by said navigation filter.

Generalization of the Method 10 to Characteristic Elements

The exemplary embodiments of the method 10 previously described are based on the use of characteristic points appearing in the images. The associated processing is simple and efficient in computing time. However, other image processing techniques may be used to calculate the condensed measurements.

More generally, the method 10 of estimation uses characteristic elements of the images, considered as representing characteristic elements of the environment. In particular, the method 10 according to other examples uses characteristic objects or a characteristic surface or surfaces, which are discussed below.

a) Characteristic Objects

Characteristic objects, tied to the environment, are for example segments of a straight line in the most simple case (a very frequent case when the carrier is moving in relation to a structured environment, for example containing buildings). The tracking of such characteristic objects from one image to another is done for example as described in the scientific publication of the authors Peer Neubert, Peter Protzel, Teresa Vidal-Calleja and Simon Lacroix, "A fast Visual Line Segment Tracker" in IEEE Int. Conf on Emerging Technologies and Factory Automation, Hamburg (Germany), September 2008.

These objects may be recognized, matched and tracked from one image to another. The differences in position and orientation of these objects from one image to another give information as to the variation in position and attitude of the carrier with respect to the environment, since geometrical relations tie them to each other. In general, a reduced number of such objects is enough to estimate without ambiguity the normalized relative poses from one image to another, and the ratios of distance traveled in a triplet of images, as described above in the case of the characteristic points.

For example, a segment of a straight line in the image may be described by two parameters: the distance to the center of the focal plane and the angle of orientation in the focal plane. This segment of a straight line in the image represents a characteristic segment of the environment which can itself be parametrized in three dimensions. The variation of the segment of a straight line from one image to another provides two parameters which are the variations of this distance and this angle. The variation of these parameters depends geometrically on the position and the orientation of the segment of a straight line of the environment in the reference frame tied to the carrier, and the movement of the carrier from one image to another. These geometrical relations may be used to estimate the condensed measurements, in the same way that the positions of the characteristic points $M_i$ in the image were used to estimate these condensed measurements. One may advantageously use a combination of characteristic points and objects, for example, by considering the ends of a characteristic object of the straight-line segment type.

b) Characteristic Surfaces

In another variant of the method, in particular when the carrier is moving in slightly structured environments (such as flying over terrain), one may assume that the pixels which are close together in the image represent points which are close together in the environment and that the environment, or a portion of this environment (which shall be called "terrain" in this case) may be described by a continuous surface, known as the characteristic surface of the environment. The objective may be to identify in its entirety the portion of the surface of the terrain which is visible in two or three images (without the aid of characteristic points or objects) at the same time as one estimates the condensed measurements. For example, one describes the surface of the terrain in the form of 3D parametrized grids (typically several hundreds of parameters). Using a first pair of images $(I_{n1}, I_{n2})$ (it is assumed that there has been a movement in position between the two images), one estimates at the same time the parameters of the surface and the condensed measurement of normalized relative pose by using the largest number of pixels possible (those representing the points of the environment which are visible in the two images), without distinction of characteristic objects or points. This can be done, for example, by using stereoscopic processing techniques such as those given for example in the article of S. M. Seitz, B. Curless, J. Diebel, D. Scharstein, and R. Szeliski, "A Comparison and Evaluation of Multi-View Stereo Reconstruction Algorithms" in Proc. CVPR 2006. The relief is thus estimated "by stereoscopic effect" from the pair of images $(I_{n1}, I_{n2})$. This estimation is done to within a scale factor, given by the distance traveled between n1 and n2 (equivalent to the base of a pair of stereoscopic images). Let us imagine that this distance is known, which eliminates the ambiguity as to the surface of the terrain. This surface being now estimated, one may predict the evolution of the image of this surface at a time n3 later than n2, as a function of the absolute pose between the times n2 and n3 (one may optionally use a model of illumination and reflectance of the terrain). By correlating the image predicted at n3 with the real image $I_{n3}$, one will be able to thus estimate not only the normalized relative pose between the times n2 and n3, as before, but also the distance traveled between n2 and n3, as being the distance which maximizes the correlation between the predicted image for this distance and the real image. If one uses only the information contained in the image, the distance traveled between n1 and n2 is not observable, nor is the distance traveled between n2 and n3, but the ratio of the distances traveled between respectively (n1, n2) and (n2, n3) will be.

Nonlimiting Examples of Application of the Invention

The use of the invention is advantageous in many instances, such as:
  carriers undergoing strong accelerations (landing vehicles, missiles): the carrier being in acceleration, the condensed measurements contain information as to the velocity and the acceleration with respect to the environment; the acceleration being known by the a priori knowledge of the command or via a measurement of the acceleration, one may deduce from this the relative velocity;
  carriers on the ground: if the motion between the first two images $I_{n1}$ and $I_{n2}$ is known by using an external odometer or a satellite navigation (GPS, even limited to a number of satellites less than 4), for example, the condensed measurements make it possible to propagate this knowledge to the image $I_{n3}$; the condensed measurements can be used as a supplement to the odometer or as a replacement for it in event of skidding, or as a supplement to a satellite navigation in event of temporary unavailability (urban canyons, etc.);
  rendezvous of two space carriers: prior to the starting of the rendezvous operations, the carriers are generally waiting or quasi-fixed in relation to each other; it is important to acquire at least two images during this phase, so that the acquisition of another image shortly after the acceleration of the hunter-carrier allows an observability of the relative distance between the carriers by utilizing the condensed measurements;
  locating of carriers a posteriori: the proposed processing may be performed on data recorded in flight then stored and processed on the ground after the flight.

The invention claimed is:

1. A method for estimating a motion of a carrier with respect to an environment in relation to which the carrier is moving, the carrier bearing on board at least one navigation sensor and at least one vision sensor producing images of the environment, the method comprising the steps, performed by a calculation device, of:
  identifying, in the images acquired by said at least one vision sensor, characteristic elements of the images representing characteristic elements of the environment;
  calculating at least one condensed measurement as a function of the characteristic elements of at least two images acquired at different times, said at least one condensed measurement being representative of characteristics of the motion of the carrier during acquisition of said at least two images;
  estimating the motion of the carrier by a navigation filter performed as a function of navigation measurements performed by said at least one navigation sensor and as a function of said at least one condensed measurement;
  wherein said at least one condensed measurement is calculated as a function furthermore of an a priori estimation of the motion of the carrier provided by the navigation filter; and
  estimating an error made in said at least one condensed measurement; estimating a relation between an error made in the a priori estimation of the motion of the carrier and the error made in said at least one condensed measurement; and wherein the navigation filter estimates the motion of the carrier as a function furthermore of the error made in said at least one condensed measurement, and as a function of the relation between the error made in the a priori estimation of the motion of the carrier and the error made in said at least one condensed measurement.

2. The method as claimed in claim 1, wherein the navigation filter estimating the motion of the carrier is a Kalman filter.

3. The method as claimed in claim 1, wherein the calculation device determines, during the calculation step, a condensed measurement representative of a ratio of distances traveled by the carrier between times of acquisition of two pairs of images of a triplet of images, as a function of characteristic elements of the images of the triplet representing the characteristic elements of the environment which are visible in each of the images of the triplet.

4. A method for estimating a motion of a carrier with respect to an environment in relation to which the carrier is moving, the carrier bearing on board at least one navigation sensor and at least one vision sensor producing images of the environment, the method comprising the steps, performed by a calculation device, of:
  identifying, in the images acquired by said at least one vision sensor, characteristic elements of the images representing characteristic elements of the environment;
  calculating at least one condensed measurement as a function of the characteristic elements of at least two images acquired at different times, said at least one condensed measurement being representative of characteristics of the motion of the carrier during acquisition of said at least two images;

estimating the motion of the carrier by a navigation filter performed as a function of navigation measurements performed by said at least one navigation sensor and as a function of said at least one condensed measurement;

wherein said at least one condensed measurement is calculated as a function furthermore of an a priori estimation of the motion of the carrier provided by the navigation filter; and estimating an error made in the a priori estimation of the motion of the carrier; and calculating said at least one condensed measurement as a function furthermore of the error made in the a priori estimation of the motion.

5. The method as claimed in claim 4, wherein the navigation filter estimating the motion of the carrier is a Kalman filter.

6. The method as claimed in claim 4, wherein the calculation device determines, during the calculation step, a condensed measurement representative of a ratio of distances traveled by the carrier between times of acquisition of two pairs of images of a triplet of images, as a function of characteristic elements of the images of the triplet representing the characteristic elements of the environment which are visible in each of the images of the triplet.

7. A method for estimating a motion of a carrier with respect to an environment in relation to which the carrier is moving, the carrier bearing on board at least one navigation sensor and at least one vision sensor producing images of the environment, the method comprising the steps, performed by a calculation device, of:

identifying, in the images acquired by said at least one vision sensor, characteristic elements of the images representing characteristic elements of the environment;

calculating at least one condensed measurement as a function of the characteristic elements of at least two images acquired at different times, said at least one condensed measurement being representative of characteristics of the motion of the carrier during acquisition of said at least two images;

estimating the motion of the carrier by a navigation filter performed as a function of navigation measurements performed by said at least one navigation sensor and as a function of said at least one condensed measurement;

wherein said at least one condensed measurement is calculated as a function furthermore of an a priori estimation of the motion of the carrier provided by the navigation filter; and wherein the a priori estimation of the motion of the carrier comprises estimating a rotation of the carrier.

8. The method as claimed in claim 7, wherein the navigation filter estimating the motion of the carrier is a Kalman filter.

9. The method as claimed in claim 7, wherein the calculation device determines, during the calculation step, a condensed measurement representative of a ratio of distances traveled by the carrier between times of acquisition of two pairs of images of a triplet of images, as a function of characteristic elements of the images of the triplet representing the characteristic elements of the environment which are visible in each of the images of the triplet.

10. A method for estimating a motion of a carrier with respect to an environment in relation to which the carrier is moving, the carrier bearing on board at least one navigation sensor and at least one vision sensor producing images of the environment, the method comprising the steps, performed by a calculation device, of:

identifying, in the images acquired by said at least one vision sensor, characteristic elements of the images representing characteristic elements of the environment;

calculating at least one condensed measurement as a function of the characteristic elements of at least two images acquired at different times, said at least one condensed measurement being representative of characteristics of the motion of the carrier during acquisition of said at least two images;

estimating the motion of the carrier by a navigation filter performed as a function of navigation measurements performed by said at least one navigation sensor and as a function of said at least one condensed measurement;

wherein said at least one condensed measurement is calculated as a function furthermore of an a priori estimation of the motion of the carrier provided by the navigation filter; and wherein the a priori estimation of the motion of the carrier comprises estimating a translation of the carrier between times of acquisition of the images.

11. The method as claimed in claim 10, wherein the navigation filter estimating the motion of the carrier is a Kalman filter.

12. The method as claimed in claim 10, wherein the calculation device determines, during the calculation step, a condensed measurement representative of a ratio of distances traveled by the carrier between times of acquisition of two pairs of images of a triplet of images, as a function of characteristic elements of the images of the triplet representing the characteristic elements of the environment which are visible in each of the images of the triplet.

13. A computer program product recorded on a non-transitory computer readable media, comprising a set of program code instructions, when executed by a processor, configure the processor to perform the steps of the method as claimed in claim 1 to estimate the motion of the carrier.

14. A calculation device for a navigation system of a carrier bearing on board at least one navigation sensor and at least one vision sensor, and comprising at least one processor and at least one memory to perform the steps of the method as claimed in claim 1 to estimate the motion of the carrier.

15. A computer program product recorded on a non-transitory computer readable media, comprising a set of program code instructions, when executed by a processor, configure the processor to perform the steps of the method as claimed in claim 4 to estimate the motion of the carrier.

16. A calculation device for a navigation system of a carrier bearing on board at least one navigation sensor and at least one vision sensor, and comprising at least one processor and at least one memory to perform the steps of the method as claimed in claim 4 to estimate the motion of the carrier.

17. A computer program product recorded on a non-transitory computer readable media, comprising a set of program code instructions, when executed by a processor, configure the processor to perform the steps of the method as claimed in claim 7 to estimate the motion of the carrier.

18. A calculation device for a navigation system of a carrier bearing on board at least one navigation sensor and at least one vision sensor, and comprising at least one processor and at least one memory to perform the steps of the method as claimed in claim 7 to estimate the motion of the carrier.

19. A computer program product recorded on a non-transitory computer readable media, comprising a set of program code instructions, when executed by a processor, configure the processor to perform the steps of the method as claimed in claim 10 to estimate the motion of the carrier.

20. A calculation device for a navigation system of a carrier bearing on board at least one navigation sensor and at least one vision sensor, and comprising at least one processor and at least one memory to perform the steps of the method as claimed in claim 10 to estimate the motion of the carrier.

* * * * *